(12) United States Patent
Oswald et al.

(10) Patent No.: US 6,975,481 B1
(45) Date of Patent: Dec. 13, 2005

(54) DRIVER SYSTEMS AND METHODS FOR AN ACTUATOR OF A HARD DISK DRIVE

(75) Inventors: Richard Oswald, San Jose, CA (US); Wei Guo, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 212 days.

(21) Appl. No.: 10/409,648

(22) Filed: Apr. 7, 2003

Related U.S. Application Data (60) Provisional application No. 60/375,573, filed on Apr. 5, 2002.

(51) Int. Cl.[7] .............................................. G11B 5/596
(52) U.S. Cl. .................................................. 360/78.05
(58) Field of Search ................................ 360/78.05, 75, 360/78.12, 294.3, 294.4, 294.5; 310/317; 318/560, 593

(56) References Cited

U.S. PATENT DOCUMENTS

| | | | | |
|---|---|---|---|---|
| 5,682,076 A | * | 10/1997 | Zumeris | 360/78.05 |
| 6,469,465 B1 | * | 10/2002 | Belser et al. | 318/560 |
| 6,541,931 B2 | * | 4/2003 | Ho et al. | 360/78.05 |
| 6,731,471 B1 | * | 5/2004 | Bonin | 360/294.3 |
| 6,778,349 B2 | * | 8/2004 | Ricotti et al. | 360/75 |

* cited by examiner

*Primary Examiner*—Sinh Tran
*Assistant Examiner*—James L Habermehl
(74) *Attorney, Agent, or Firm*—Tejpal S. Hansra (57) ABSTRACT

A displacement system for a hard disk drive comprising a driving circuit and first and second displacement elements. The driving circuit generates a driving signal from a source voltage level, a control signal, and a reference voltage level. The driving signal is applied across the first displacement element with respect to the reference voltage level. The driving signal is applied across the second displacement element with respect to the source voltage level.

54 Claims, 3 Drawing Sheets

DRIVER SYSTEMS AND METHODS FOR AN ACTUATOR OF A HARD DISK DRIVE

RELATED APPLICATIONS

Priority is claimed from U.S. Provisional Patent Application Ser. No. 60/375,573 filed on Apr. 5, 2002, which is incorporated by reference in its entirety.

FIELD OF THE INVENTION

The present invention relates to digital storage devices and, more particularly, to actuator systems for hard disk drives.

BACKGROUND OF THE INVENTION

A disk drive is a digital data storage device that stores information on concentric tracks on a storage disk. The storage disk is coated on one or both of its primary surfaces with a magnetic material that is capable of changing its magnetic orientation in response to an applied magnetic field. During operation of a disk drive, the disk is rotated about a central axis at a constant rate. To read data from or write data to the disk, a magnetic transducer (or head) is positioned above (or below) a desired track of the disk while the disk is spinning.

Writing is performed by delivering a polarity-switching write current signal to the magnetic transducer while the transducer is positioned above (or below) the desired track. The write signal creates a variable magnetic field at a gap portion of the magnetic transducer that induces magnetically polarized transitions on the desired track. The magnetically polarized transitions are representative of the data being stored.

Reading is performed by sensing the magnetically polarized transitions on a track with the magnetic transducer. As the disk spins below (or above) the transducer, the magnetically polarized transitions on the track induce a varying magnetic field into the transducer. The transducer converts the varying magnetic field into a read signal that is delivered to a preamplifier and then to a read channel for appropriate processing. The read channel converts the read signal into a digital signal that is processed and then provided by a controller to a host computer system.

When data is to be written to or read from the disk, the transducer must be moved radially relative to the disk. In a seek mode, the transducer is moved radially inwardly or outwardly to arrange the transducer above a desired track. In an on-rack mode, the transducer reads data from or writes data to the desired track. The tracks are typically not completely circular. Accordingly, in the on-track mode the transducer must be moved radially inwardly and outwardly to ensure that the transducer is in a proper position relative to the desired track. The movement of the transducer in on-track mode is referred to as track following.

Modern hard disk drives employ a dual-actuator system for moving the transducer radially relative to the disk. A first stage of a dual-actuator system is optimized for moving the transducer relatively large distances. A second stage of a dual-actuator system is optimized for moving the transducer relatively small distances. The present invention relates to hard disk drives having single or dual-stage actuator systems.

Figure 1:
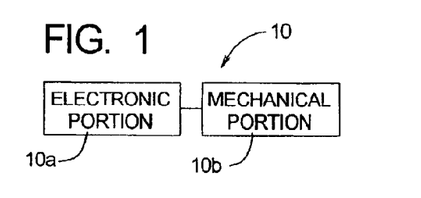
FIG. 1 is a simplified block diagram depicting electronic and mechanical portions of a hard disk drive.

FIG. 1 depicts a disk drive 10 comprising an electronic portion 10a and a mechanical portion 10b. The electronic portion 10a comprises control electronics typically including a preamplifier, a read/write channel, a servo control unit, a random access memory (RAM), and read only memory (ROM), spindle motor and VCM controller driving electronics. The electronic portion 10a is or may be conventional and will not be described herein beyond what is necessary for a complete understanding of the present invention.

Figure 2:
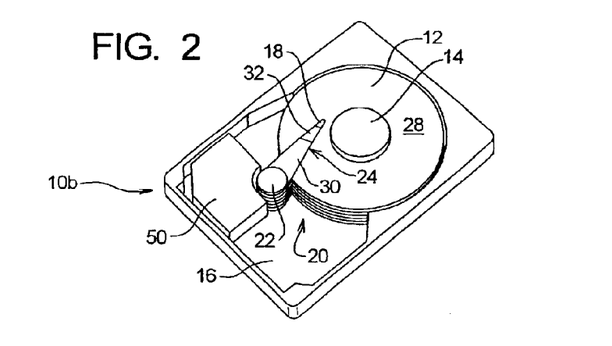
FIG. 2 is a perspective view of a mechanical portion of the hard disk drive of FIG. 1.
Figure 3:
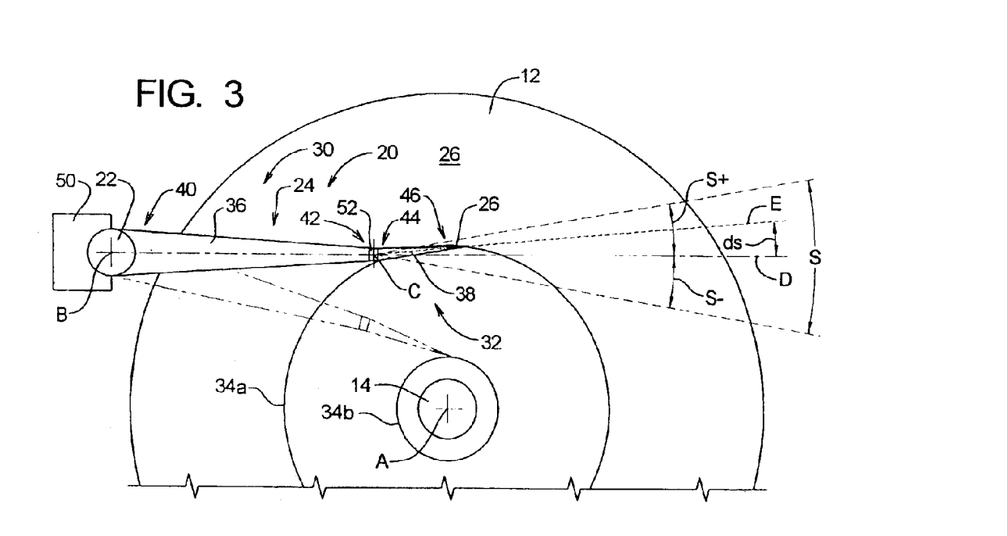
FIG. 3 is a schematic representation of some components of the mechanical portion of the disk drive of FIG. 2.

FIGS. 2 and 3 show that the mechanical portion 10b of the disk drive 10 includes a disk 12 that is rotated by a spin motor 14. The spin motor 14: is mounted to a base plate 16. The disk drive 10 includes at least one and typically a plurality of disks 12, each with one or two recording surfaces.

During use, the disk 12 is rotated about a spindle axis A. The disk drive 10 further comprises what is commonly referred to as a head 18. The head 18 comprises or supports the magnetic read/write transducer described above and will thus be referred to herein as the component of the disk drive 10 that reads data from and writes data to the disk 12.

FIGS. 2 and 3 further illustrate a positioning system 20 of the disk drive 10. The positioning system 20 comprises a bearing assembly 22 that supports at least one actuator arm assembly 24. The actuator arm assembly 24 supports the head 18 adjacent to one recording surface 26 of one of the disks 12. Typically, the bearing assembly 22 will support one actuator arm assembly 24 and associated head 18 adjacent to each of the recording surfaces 26 of each of the disks 12. The actuator arm assemblies 24 allow each head 18 to be moved as necessary to seek to a desired track 34 in seek mode and then follow the desired track 34 in track following mode.

The exemplary positioning system 20 depicted in FIGS. 2 and 3 is a dual-stage system. Accordingly, each actuator arm assembly 24 comprises a first actuator 30 and a second actuator 32. The principles of the present invention are currently of primary importance when applied to the second actuator of a dual-stage actuator system, and that application of the present invention will be described herein. However, the present invention may in the future have application to a single stage actuator system. The scope of the present invention should thus be determined by the claims appended hereto and not the following detailed discussion.

For ease of illustration, FIGS. 2 and 3 depict the first and second actuators 30 and 32 as comprising elongate arms 36 and 38, respectively, and the actuators 30 and 32 may be implemented as shown in FIGS. 2 and 3. Conventionally, the bearing assembly 22 is also considered part of the first actuator 30. In particular, the bearing assembly 22 supports a proximal end 40 of the arm 36 of the first actuator 30 for rotation about a first axis B, while a distal end 42 of the first actuator arm 36 supports a proximal end 44 of an arm 38 of the second actuator 32 for rotation about a second axis C. In this case, the head 18 is supported on a distal end 46 of the second actuator arm 38.

The actuators 30 and 32 may, however, be implemented using other structures or combinations of structures. For example, the first actuator 30 may comprise an elongate arm that rotates about a first axis B, while the second actuator 32 may comprise a suspension assembly rigidly connected to a distal end of the first actuator. In this case, the first actuator is able to rotate about an actuator axis, while the head 18 would be suspended from the second actuator for linear movement along the disk radius relative to the position of the first actuator. The actuators 30 and 32 may thus take any number of physical forms, and the scope of the present invention should not be limited to the exemplary actuators 30 and 32 depicted in FIGS. 2 and 3.

FIG. 3 also illustrates that the exemplary actuators 30 and 32 of the positioning system 20 further comprise a first electromechanical transducer 50 and a second electromechanical transducer 52. In response to a first control signal, the first transducer 50 moves the first actuator arm 36 to change an angular position of the head 18 relative to the first axis B. The second transducer 52 is supported by the distal end 42 of the first actuator 30 to rotate the head 18 about the second axis C in response to a second control signal. In FIG. 3, an angular position of the first actuator arm 36 is represented by reference character D, while an angular position of the second actuator arm 38 is represented by reference character E.

A range of movement "S" associated with the second transducer 32 is defined by the stroke "s+" and "s−" in either direction relative to a neutral position D defined by the first actuator arm 36. The term "actual displacement" (ds in FIG. 3) refers to the angular difference at any point in time of the head 18 relative to the neutral position as defined by the position D of the first actuator 30. When the head 18 is in the neutral position, the actual displacement of the second actuator arm 38 is zero.

FIG. 3 further identifies arbitrary first and second tracks 34a and 34b on the disk 12. The actuator arm assembly 24 is shown in an initial position by solid lines and in a target position by broken lines; the first track 34a will thus be referred to as the "initial track" and the second track 34b will be referred to as the "target track". It should be understood that the terms "initial track" and "target track" are relative to the position of the head 18 before and after a seek operation. Any track 34 on the disk 12 may be considered the initial track or the target track depending upon the state of the disk drive 10; before and after a particular seek operation.

The present invention is of particular importance in the context of an electromechanical transducer for a hard disk drive comprising two or more displacement elements operated by a single control signal. In particular, the secondary actuator 32 of the exemplary disk drive 10 can be implemented using displacement elements such as microelectromechanical system (MEMS) transducers or piezoelectric transducers. The present invention is also of particular significance when the displacement elements comprise piezoelectric material. The present invention will be thus described herein in the context of a dual-stage actuator for a hard disk drive in which the second stage is formed by two or more piezoelectric elements.

It should be noted, however, that the principles of the present invention can also be applied to an electromechanical transducer of a single stage actuator system or to an electromechanical transducer used to displace the first actuator of a dual-stage actuator system.

Piezoelectric materials are materials that mechanically deform when an electric field is applied thereto. A single piezoelectric element can be used as a piezoelectric actuator. An electromechanical transducer for the second stage actuator of a dual-stage actuator system of a disk drive can be implemented as a pair of piezoelectric transducer elements driven in opposite directions by a single control signal.

Commercially available piezoelectric materials are typically ferroelectric ceramics containing crystal dipoles that, initially, are randomly oriented. During what is referred to as the poling process, an electric field is applied to the ceramic material to cause the dipoles to become aligned. After the electric field is removed, the dipoles remain in substantial alignment and the material exhibits piezoelectric properties. A piezoelectric ceramic can, however, become depoled if an electric field is applied to the material in a direction opposite to that of the original poling electric field. Accordingly, a bias voltage is typically applied to piezoelectric elements during use to ensure that the piezoelectric material is always subjected to an electric field in the same direction as the original poling field.

Figure 4:
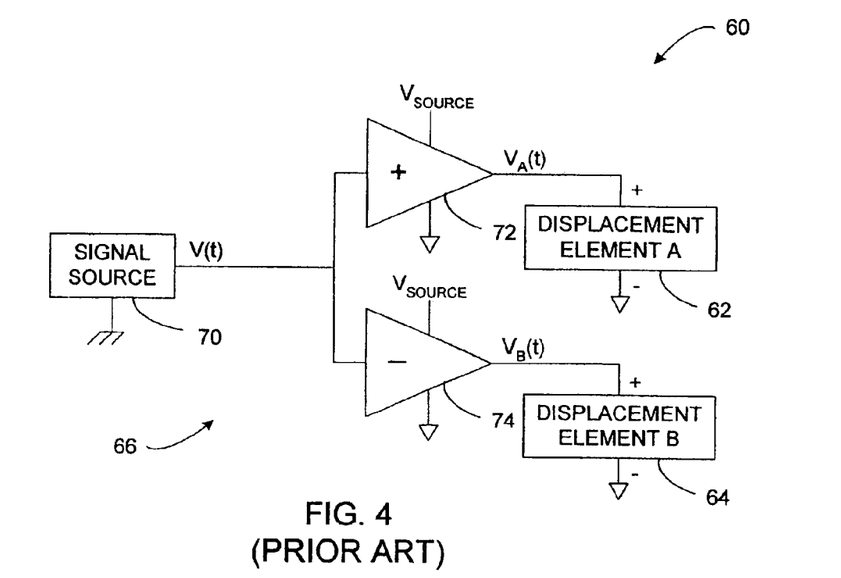
FIG. 4 is a block diagram depicting a prior art displacement system for a second stage actuator of a hard disk drive.

FIG. 4 depicts a block diagram of an example of a prior art displacement system 60 that may be used as the second transducer 52. The displacement system 60 comprises first and second piezoelectric displacement elements 62 and 64 and a driving circuit 66. The mechanical coupling between the first and second displacement elements 62 and 64 and the head 18 depends upon the nature of the second actuator 32 and head 18. Also, as described above, the second transducer 52 may be implemented using alternative technologies such as MEMS actuators, which may also change the nature of the mechanical coupling between the head 18 and the displacement elements 62 and 64.

The driving circuit 66 comprises a signal source 70 and first and second amplifier circuits 72 and 74. The signal source 70 generates a control signal v(t) from an error signal representative of a difference between the position of the head 18 and the position of the desired track 34. As described in the following equations (1) and (2), the amplifier circuits 72 and 74 generate respective first and second driving signals $v_A(t)$ and $v_B(t)$ from the control signal v(t) and a no signal bias level $V_{bias}$, where:

$$v_A(t) = V_{bias} + v(t) \qquad (1)$$

$$v_B(t) = V_{bias} - v(t) \qquad (2)$$

The driving signals $v_A(t)$ and $v_B(t)$ are applied directly across the displacement elements 62 and 64 to cause these elements 62 and 64 to deform and thereby displace the transducer head 18 relative to the first actuator 30 as determined by the control signal v(t).

Figure 5:
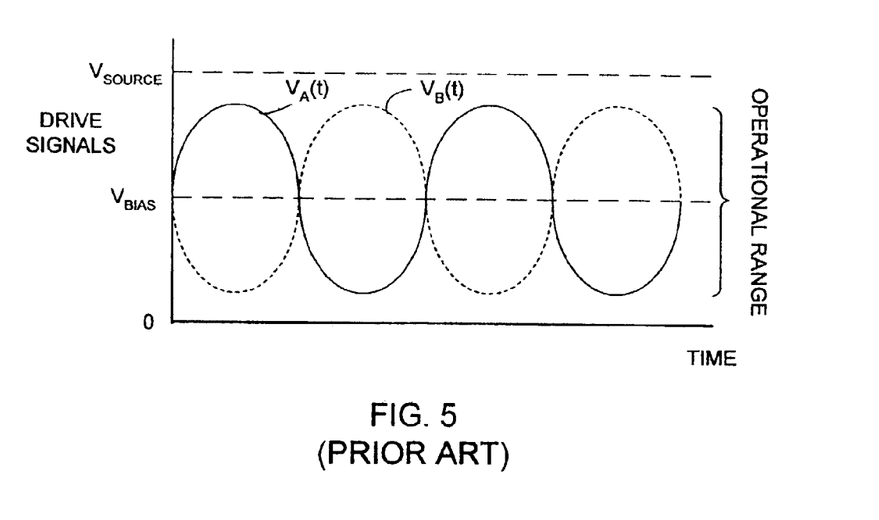
FIG. 5 represents hypothetical driving signal voltages and a bias voltage versus time illustrative of the certain non-numerical characteristics of drive signal generated by the prior art driving circuit of FIG. 4.

The no signal bias level $V_{bias}$ of the driving signals $v_A(t)$ and $v_B(t)$ is predetermined so that the instantaneous range of values for $v_A(t)$ and $v_B(t)$ lies between the reference and supply voltages as shown in FIG. 5. Also as shown in the example depicted in FIG. 5, the resulting driving signals $v_A(t)$ and $v_B(t)$ are the inverse of each other and vary within an operational range above zero volts and less than $V_{SOURCE}$. The waveforms depicted in FIG. 5 are for illustration purposes only and are not representative of the actual control signal v(t).

When applied directly across the first and second displacement elements 62 and 64, the first and second driving signals $v_A(t)$ and $v_B(t)$ cause the displacement elements 62 and 64 to move in opposition to each other.

In addition, the driving signals $v_A(t)$ and $v_B(t)$ are always positive relative to the polarity of the displacement elements 62 and 64. The driving signals $v_A(t)$ and $v_B(t)$ thus ensure that the piezoelectric material forming the elements 62 and 64 are always subject to a positive electric field and are thus not depoled during normal operation.

A need exists, however, for a drive system for the secondary actuator system of a dual-stage actuator of a disk drive that is less complex and less expensive to implement than conventional secondary actuator systems.

SUMMARY OF THE INVENTION

The present invention may be embodied as a displacement system for a hard disk drive comprising a driving circuit and first and second displacement elements. The driving circuit generates a driving signal from a source voltage level, a control signal, and a reference voltage level. The driving signal is applied across the first displacement element with respect to the reference voltage level. The driving signal is applied across the second displacement element with respect to the source voltage level.

The present invention may also be embodied as a method of driving an actuator of a hard disk drive. The first step of the method is to generate a driving signal from a source voltage level, a control signal, and a reference voltage level. The driving signal is applied across the first displacement element with respect to the reference voltage level. The driving signal is applied across the second displacement element with respect to the source voltage level.

The objects, features, embodiments, and advantages of the invention will be apparent from the following specification taken in conjunction with the following drawings.

DETAILED DESCRIPTION OF THE PREFERRED EMBODIMENT

Figure 6:
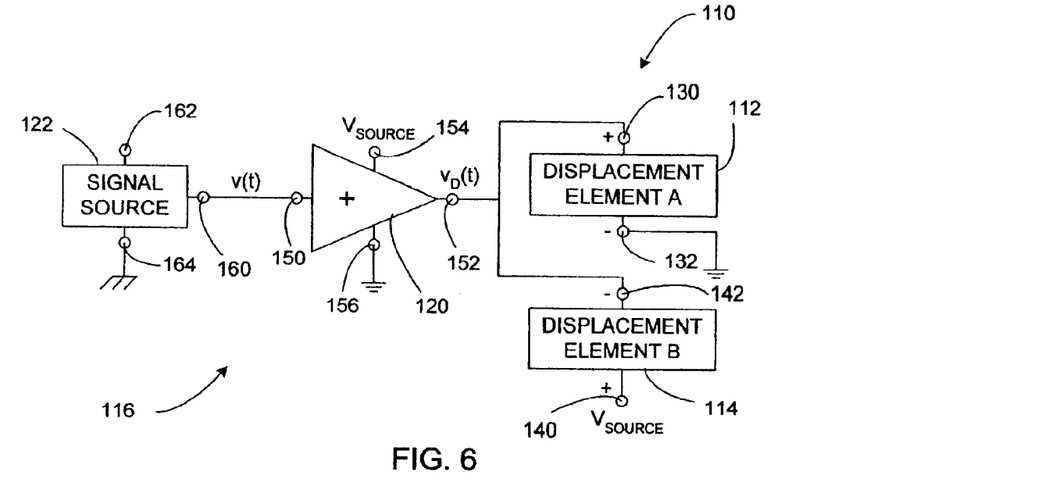
FIG. 6 is a block diagram depicting a driving circuit for an actuator of a hard disk drive of the present invention.

FIG. 6 depicts a block diagram of an example of a displacement system 110 constructed in accordance with, and embodying, the principles of the present invention. The displacement system 110 is an electromechanical transducer intended to be used in combination with the components of a disk drive system such as the disk drive system 10 described above.

The displacement system 110 comprises first and second displacement elements 112 and 114 and a driving circuit 116. Depending upon the characteristics of the disk 12, the displacement system 110 may be used as an electromechanical transducer for driving a single stage actuator or as either the first transducer 50 or the second transducer 52 of a dual-stage actuator. As generally described above, however, the displacement system 110 is currently of particular relevance when used as the second transducer 52 to displace the head 18 relative to the first actuator 30 in a dual-stage actuator system.

The mechanical connections among the second stage actuator 32, the first and second displacement elements 112 and 114, and the head 18 can take any of a number of forms. For example, the head 18 may be mounted on the distal end 46 of the second actuator 32, and the displacement elements 112 and 114 may be connected between the first and second actuators 30 and 32. In this configuration, the displacement elements cause the head 18 to rotate through an arc relative to the first actuator 30. As another example, the displacement elements 112 and 114 may be arranged on either side of the head 18. In this case, operation of the displacement elements 112 and 114 will linearly translate the head 18 relative to the first actuator 30.

As described above, while the exemplary displacement elements 112 and 114 are implemented using piezoelectric transducers, other electromechanical transducer technologies, such as MEMS actuators, may be used in addition or instead. The characteristics of the transducer technology may also affect the nature of the mechanical coupling between the head 18 and the displacement elements 112 and 114. In any event, the precise nature of the mechanical coupling between the head 18 and the displacement elements 112 and 114 is not critical to the present invention and thus will not be described herein in detail.

The driving circuit 116 comprises an amplifier circuit 120 and a signal source 122. As with the signal source 70 described above, the signal source 122 is typically part of larger control system that generates a control signal v(t) from an error signal representative of a difference between position of the head 18 and the position of the desired track 34. The details of the signal source 122 will also be described herein only to the extent necessary for a complete understanding of the present invention.

The amplifier circuit 120 is an amplifier appropriate for generating an output signal for driving the first displacement element 112 from an input signal and a reference voltage. The details of construction and operation of the amplifier circuit 120 are well within the skill of one of ordinary skill in the art and will be described herein only to the extent necessary for a complete understanding of the present invention.

The exemplary amplifier circuit 120 generates a driving signal $v_D(t)$ from a no signal bias voltage level $V_{BIAS}$ and the control signal v(t). The driving signal $V_D(t)$ is applied across the first displacement element 112 with respect to a reference voltage level, or ground in the exemplary secondary displacement system 110. The driving signal $v_D(t)$ is applied across the second displacement element 114 with respect to a source voltage level $V_{SOURCE}$.

Figure 7:
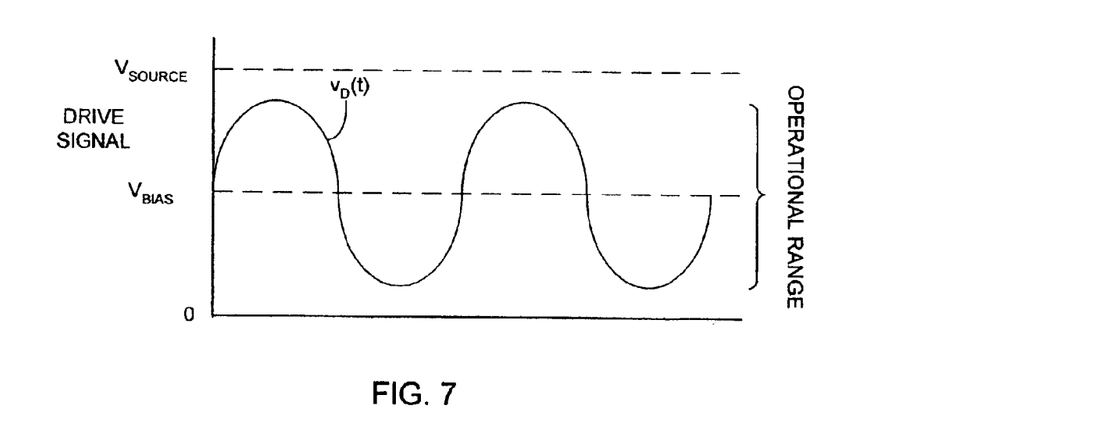
FIG. 7 represents a hypothetical driving signal voltage and voltage levels illustrative of certain non-numerical characteristics of the drive signal generated by the circuit of FIG. 6.

More specifically, as depicted in FIG. 7 and described in the following equation (3), the amplifier circuit 120 generates the driving signal $v_D(t)$ from the control signal v(t) and the no signal bias voltage level $V_{BIAS}$ as follows:

$$V_D(t) = V_{BIAS} + v(t). \tag{3}$$

The driving signal $v_D(t)$ is applied directly across the first displacement element 112 to cause this element 112 to deform in a manner determined by the control signal v(t).

The second displacement element 114 is also caused to deform in a manner determined by the control signal v(t); however, because the driving signal $v_D(t)$ is applied to the second displacement element 114 with respect to the source voltage $V_{SOURCE}$, the second displacement element 114 can be configured to move in opposition to the first displacement element 112. Accordingly, the first and second displacement elements 112 and 114 may be mechanically coupled to the transducer head 18 to displace the head 18 relative to the first actuator 30 as determined by the control signal v(t).

The no signal bias voltage level $V_{BIAS}$ is predetermined to lie between the reference voltage and the source voltage $V_{SOURCE}$ such that all instantaneous values of $V_D(t)$ lie between the reference voltage and the source voltage $V_{SOURCE}$. The electric field applied across the first displacement element 112 is thus always positive.

In most cases, the no signal bias level $V_{BIAS}$ is set to be approximately half as large as the source voltage $V_{SOURCE}$, but the present invention may be embodied with other relationships between the no signal bias voltage level $V_{BIAS}$ and the source voltage level $V_{SOURCE}$. The electric field applied across the second displacement element 114 can also be held positive to inhibit depoling of the second element 114.

The displacement system 110 thus comprises only one amplifier circuit 120 for the two displacement elements 112 and 114. In contrast, as depicted in FIG. 4, the conventional displacement system 60 comprises two amplifier circuits 72 and 74, one dedicated for driving each of the displacement elements 62 and 64. The displacement system 110 eliminates one entire amplifier circuit and is thus significantly less expensive to implement than the displacement system 60 described above.

Although one entire driver is omitted from the driving circuit 116, the displacement elements 112 and 114 are subject to a positive electric field during normal operation. Therefore, if the displacement elements 112 and 114 are polarized, as in the case of piezoelectric elements, the driving circuit 116 can differentially drive these elements 112 and 114 while still maintaining proper poling of the elements 112 and 114.

In addition, both displacement members 112 and 114 can be driven by a varying driving signal ($v_D(t)$) carried by a single trace. Given the limited space available for traces to the displacement members 112 and 114, the traces must be located very close together. Replacing a trace carrying a varying driving signal ($v_B(t)$) with a trace carrying a DC signal ($V_2$) reduces the likelihood that the driving signal or signals will interfere with data signals carried by a nearby trace.

With the foregoing understanding of the general principles of construction and operation of the present invention in mind, the details of construction and operation of the exemplary displacement system 110 will now be described in further detail.

FIG. 6 illustrates that the first displacement element 112 comprises positive and negative terminals 130 and 132 and the second displacement element 114 comprises positive and negative terminals 140 and 142, respectively. The positive and negative terminals 130, 140 and 132, 142 indicate the polarity of the displacement elements 112 and 114. In other words, a property of the displacement elements 112 and 114 polarizes these elements such that the positive terminals 130 and 140 should be maintained at a higher voltage level than the negative terminals 132 and 142. For example, in the case of a piezoelectric element, the positive and negative terminals indicate how a voltage is to be applied across the terminals to inhibit depoling of the piezoelectric element.

The amplifier circuit 120 comprises an input terminal 150, an output terminal 152, a source terminal 154, and a reference terminal 156. The signal source 122 comprises an output terminal 160, a source terminal 162, and a reference terminal 164. The output terminal 160 of the signal source 122 is coupled to the input terminal 150 of the amplifier circuit 120.

The control signal v(t) is thus present at the input terminal 150 of the amplifier circuit 120. The exemplary amplifier circuit 120 is configured with the no signal bias voltage level VBIAS such that the driving signal $v_D(t)$ is thus the sum of the no signal bias voltage level $V_{BIAS}$ and the control signal v(t), as represented by equation (3) above and shown in FIG. 7.

The output terminal 152 of the amplifier circuit 120 is connected to the positive terminal 130 of the first displacement element 112 and to the negative terminal 142 of the second displacement element 114. The reference terminal 156 of the amplifier circuit 120 is connected to a first reference voltage level, typically ground or zero volts. The negative terminal 132 of the first displacement element 112 is also connected to the first reference voltage level. The positive terminal 140 of the second displacement element 114 is connected to the source voltage level $V_{SOURCE}$.

The source terminal 154 of the amplifier circuit 120 is connected to a voltage source that allows the amplifier 120 to function properly; for convenience, the source terminal 154 is connected to the source voltage $V_{SOURCE}$ in the exemplary displacement system 110.

The source and reference terminals 162 and 164 are also connected to source and reference voltage levels appropriate for proper operation of the signal source 122. The reference terminal 164 may be connected to the same reference voltage level (ground or zero volts) as the reference terminal 156 of the amplifier circuit 120 and the negative terminal 132 of the first displacement element 114. In this case, the source terminal 162 of the signal source 164 could be connected to the source voltage level $V_{SOURCE}$ or perhaps another voltage level between $V_{SOURCE}$ and the reference voltage. However, with appropriate choice of the level of the bias voltage $V_{BIAS}$ of the amplifier circuit 120, the signal source 122 may use source and reference voltage levels different from those of the amplifier circuit 120.

The characteristics of the control signal v(t) define an operating range as shown in FIG. 7. Under these conditions, the driving signal $v_D(t)$ is always positive with respect to ground or zero volts during normal operation.

The power supply or supplies for generating the bias and source voltage levels $V_{BIAS}$ and $V_{SOURCE}$ are not important to the principles of the present invention and will not be described in detail herein. The bias and source voltage levels $V_{BIAS}$ and $V_{SOURCE}$ may be separately generated by conventional power supplies, or a single power supply may be used to generate the source voltage $V_{SOURCE}$ and the bias voltage level $V_{BIAS}$ derived from the source voltage $V_{SOURCE}$.

In any event, for the driving circuit 116 to operate properly, the bias voltage level $V_{BIAS}$ is set to be less than the source voltage $V_{SOURCE}$. In the preferred system 110, the bias voltage $V_{BIAS}$ is approximately half the magnitude of the source voltage $V_{SOURCE}$.

By maintaining positive terminal 140 of the second displacement element 114 at the source voltage $V_{SOURCE}$ and applying the driving signal $v_D(t)$ to the negative terminal of the second displacement element 114, the voltage across the second displacement element 114 is always positive with respect to the polarity of this element 114. For polarized displacement elements such as piezoelectric elements, the electric field established by the voltage across the second displacement element 114 will be positive with respect to the polarity of the piezoelectric element.

In addition, from the perspective of the polarity of the second displacement element 114, the second displacement element 114 is subject to an electric field that is the inverse of the electric field across the first displacement element 112. The second displacement element 114 thus can be configured to move in opposition to the first displacement element 112 as required by a differential actuator system.

The present invention may be embodied in forms other than the form described herein. For example, a difference amplifier may be used for the amplifier circuit 120. It should thus be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

We claim:

1. A displacement system for a hard disk drive, comprising:
   a driving circuit for generating a driving signal from a source voltage, level, a control signal, and a reference voltage level;
   a first displacement element, where the driving signal is applied across the first displacement element with respect to the reference voltage level; and
   a second displacement element, where the driving signal is applied across the second displacement element with respect to the source voltage level.

2. A displacement system as recited in claim 1, further comprising a signal source for generating the control signal.

3. A displacement system as recited in claim 1, in which:
   the driving signal has an operating range; and
   the operating range of the driving signal lies within a range substantially between the source voltage level and the reference voltage level.

4. A displacement system as recited in claim 3, in which:
   a no signal bias voltage level is associated with the driving signal; and
   the no signal bias voltage level is approximately one-half of the source voltage level.

5. A displacement system as recited in claim 1, in which:
   a no signal bias voltage level is associated with the driving signal; and
   the no signal bias voltage level is approximately one half of the source voltage level.

6. A displacement system as recited in claim 1, in which the first and second displacement elements are piezoelectric elements.

7. A displacement system as recited in claim 6, in which:
   a no signal bias voltage level is associated with the driving signal;
   the piezoelectric elements are poled; and
   the source voltage level, the no signal bias voltage level, and the reference voltage level are predetermined to inhibit depoling of the piezoelectric elements.

8. A displacement system as recited in claim 1, in which the first and second displacement elements are MEMS devices.

9. A displacement system as recited in claim 1, in which:
   the hard disk drive comprises
     a head, and
     at least one disk having a plurality of tracks; and
   the first and second displacement elements are configured to displace the head along a radius of the at least one disk.

10. A displacement system as recited in claim 1, in which:
    the hard disk drive comprises
      a base,
      a first actuator movably supported on the base,
      a second actuator supported on the first actuator, and
      at least one disk having a plurality of tracks, where the at least one disk rotates relative to the base; and
    the first and second displacement elements are configured to displace the head relative to the first actuator.

11. A displacement system as recited in claim 10, in which the hard disk drive further comprises a first transducer for displacing the first actuator relative to the base.

12. A displacement system as recited in claim 1, in which:
    the hard disk drive further comprises
      at least one disk,
      a head mounted on a first actuator, and
      a first transducer for displacing the first actuator along a radius of the at least one disk; and
    the first and second displacement elements are configured to displace the head relative to the first actuator.

13. A displacement system as recited in claim 1, in which the driving circuit generates the driving signal from the control signal and a predetermined no signal bias voltage level.

14. A hard disk drive, comprising:
    at least one disk having a plurality of tracks;
    a head for writing data to and reading data from the at least one disk;
    a first actuator movably supported for movement along a radius of the at least one disk;
    a second actuator supported by the first actuator;
    a first transducer for displacing the first actuator along the radius of the at least one disk;
    a driving circuit for generating a driving signal from a control signal and a first voltage level; and
    first and second displacement elements coupled between the first actuator and the head; whereby
    the driving signal is applied across the first displacement element with respect to a reference voltage level;
    the driving signal is applied across the second displacement element with respect to the first voltage level; and
    the driving signal causes the first and second displacement elements to displace the head relative to the first actuator.

15. A hard disk drive as recited in claim 14, further comprising a signal source for generating the control signal.

16. A hard disk drive as recited in claim 14, in which:
    the driving signal has an operating range; and
    the operating range of the driving signal lies within a range substantially between the first voltage level and the reference voltage level.

17. A hard disk drive as recited in claim 14, in which:
    a bias voltage level is associated with the driving signal; and
    the bias voltage level is approximately one-half the first voltage level.

18. A hard disk drive as recited in claim 16, in which:
    a bias voltage level is associated with the driving signal; and
    the bias voltage level is approximately one-half of the first voltage level.

19. A hard disk drive as recited in claim 14, in which the first and second displacement elements are piezoelectric elements.

20. A hard disk drive as recited in claim 19, in which:
    a bias voltage level is associated with the driving signal;
    the piezoelectric elements are poled; and
    the first voltage level, the bias voltage level, and the reference voltage level are predetermined to inhibit depoling of the piezoelectric elements.

21. A hard disk drive as recited in claim 14, in which the first and second displacement elements are MEMS devices.

22. A hard disk drive as recited in claim 14, in which:
    the second actuator is movably supported on the first actuator;

the head is supported by the second actuator; and the first and second displacement elements are configured to displace the second actuator relative to the first actuator.

23. A secondary actuator as recited in claim 14, in which the driving circuit generates the driving signal from a predetermined bias voltage level and the control signal.

24. A displacement system for a hard disk drive, comprising:

an amplifier circuit defining a drive input terminal and a drive output terminal, where
the drive input terminal is coupled to a control signal,
the amplifier circuit generates a driving signal at the drive output terminal from the control signal, a source voltage level, and a reference voltage level;
a first displacement element having a first positive terminal coupled to the drive output terminal and a first negative terminal coupled to the reference voltage level; and
a second displacement element having a second positive terminal coupled to the source voltage level and a second negative terminal coupled to the drive output terminal.

25. A displacement system as recited in claim 24, further comprising a signal source for generating the control signal, where the signal source is coupled to the drive input terminal.

26. A displacement system as recited in claim 24, in which:

the driving signal has an operating range; and
the operating range of the driving signal lies within a range substantially between the source voltage level and the reference voltage level.

27. A displacement system as recited in claim 26, in which:

a no signal bias voltage level is associated with the driving signal; and
the no signal bias voltage level is approximately one-half of the first voltage level.

28. A displacement system as recited in claim 24, in which:

a no signal bias voltage level is associated with the driving signal; and
the no signal bias voltage level is approximately one-half of the source voltage level.

29. A displacement system as recited in claim 24, in which the first and second displacement elements are piezoelectric elements.

30. A displacement system as recited in claim 29, in which:

a no signal bias voltage level is associated with the driving signal; and
the piezoelectric elements are poled; and
the source voltage level, no signal bias voltage level, and reference voltage level are predetermined to inhibit depoling of the piezoelectric elements.

31. A displacement system as recited in claim 24, in which the first and second displacement elements are MEMS devices.

32. A displacement system as recited in claim 24, in which:

the hard disk drive comprises
a head, and
at least one disk having a plurality of tracks; and
the first and second displacement elements are configured to displace the head along a radius of the at least one disk.

33. A displacement system as recited in claim 24, in which:

the hard disk drive comprises
a base,
a first actuator movably supported on the base,
a second actuator supported on the first actuator, and
at least one disk having a plurality of tracks, where the at least one disk rotates relative to the base; and
the first and second displacement elements are configured to displace the head relative to the first actuator.

34. A displacement system as recited in claim 33, in which the hard disk drive further comprises a first transducer for displacing the first actuator relative to the base.

35. A displacement system as recited in claim 24, in which the amplifier circuit generates the driving signal from a predetermined bias voltage level and the control signal.

36. A method for driving an actuator of a hard disk drive, comprising:

generating a driving signal from a first voltage level, a control signal, and a reference voltage level;
applying the driving signal across the first displacement element with respect to the reference voltage level; and
applying the driving signal across the second displacement element with respect to the first voltage level.

37. A method as recited in claim 36, further comprising the step of providing a signal source for generating the control signal.

38. A method as recited in claim 36, further comprising the steps of:

defining an operating range of the driving signal; and
generating the first voltage level such that the operating range of the driving signal lies within a range substantially between the first voltage level and the reference voltage level.

39. A method as recited in claim 38, further comprising the steps of:

generating the driving signal further from a no signal bias voltage level; and
generating the source voltage level such that the no signal bias voltage level is approximately one-half of the first voltage level.

40. A method as recited in claim 36, further comprising the steps of:

generating the driving signal further from a no signal bias voltage level; and
generating the source voltage level such that the no signal bias voltage level is approximately one-half of the first voltage level.

41. A method as recited in claim 36, further comprising the step of forming the first and second displacement elements with piezoelectric elements.

42. A method as recited in claim 41, further comprising the steps of:

further generating the driving signal from a no signal bias voltage level;
poling the piezoelectric elements; and
predetermining the source voltage level, the no signal bias voltage level, and the reference voltage level to inhibit depoling of the piezoelectric elements.

43. A method as recited in claim 36, further comprising the step of forming the first and second displacement elements with MEMS devices.

44. A method as recited in claim 36, in which the hard disk drive comprises a head and at least one disk having a plurality of tracks, further comprising the step of deforming the first and second displacement elements to displace the head along a radius of the at least one disk.

45. A method as recited in claim 36, in which the amplifier circuit generates the driving signal from a predetermined no signal bias voltage level and the control signal.

46. A method for displacing an actuator of a hard disk drive, comprising:
- generating a first voltage level with respect to a reference voltage level;
- generating a driving signal based on the first voltage level and a control signal;
- coupling the driving signal to a first positive terminal of a first displacement element;
- coupling the reference voltage level to a first negative terminal of the first displacement element;
- coupling the first voltage level to a second positive terminal of a second displacement element;
- coupling the driving signal to a second negative terminal of the second displacement element; and
- operably connecting the first and second drive elements to the actuator such that deformation of the first and second drive elements displaces the actuator.

47. A method as recited in claim 46, further comprising the step of providing a signal source for generating the control signal.

48. A method as recited in claim 46, further comprising the steps of:
- defining an operating range associated with the driving signal; and
- generating the first voltage level such that the operating range of the driving signal lies within a range substantially between the first voltage level and the reference voltage level.

49. A method as recited in claim 48, further comprising the steps of:
- generating the driving signal further from a no signal bias voltage level; and
- generating the no signal bias voltage level such that a magnitude thereof is approximately one-half of the first voltage.

50. A method as recited in claim 46, further comprising the steps of:
- generating the driving signal further from a no signal bias voltage level; and
- generating the no signal bias voltage level such that a magnitude thereof is approximately one-half the first voltage level.

51. A method as recited in claim 46, in which the step of providing the first and second displacement elements comprises the step of providing first and second piezoelectric elements.

52. A method as recited in claim 51, further comprising the steps of:
- generating the driving signal further from a no signal bias voltage level;
- poling the piezoelectric elements; and
- generating the first and no signal bias voltage levels to inhibit depoling of the piezoelectric elements.

53. A method as recited in claim 46, in which the step of providing the first and second displacement elements comprises the step of providing first and second MEMS devices.

54. A method as recited in claim 46, in which the driving signal is further generated from a predetermined no signal bias voltage level and the control signal.

* * * * *